May 12, 1959

R. S. THATCHER

2,886,795

APPARATUS FOR GENERATING A FAMILY OF CURVES
FROM A SINGLE MASTER CONTROL ELEMENT

Filed May 3, 1956

Russell S. Thatcher
INVENTOR.

BY Vincent Martin
and
Jo E. Edwards
ATTORNEYS

May 12, 1959

R. S. THATCHER

2,886,795

APPARATUS FOR GENERATING A FAMILY OF CURVES
FROM A SINGLE MASTER CONTROL ELEMENT

Filed May 3, 1956

Russell S. Thatcher
INVENTOR.

BY Vincent Martin
and
Joel E. Edwards
ATTORNEYS

May 12, 1959 R. S. THATCHER 2,886,795
APPARATUS FOR GENERATING A FAMILY OF CURVES
FROM A SINGLE MASTER CONTROL ELEMENT
Filed May 3, 1956 6 Sheets-Sheet 6

Russell S. Thatcher
INVENTOR.

United States Patent Office 2,886,795
Patented May 12, 1959

2,886,795

APPARATUS FOR GENERATING A FAMILY OF CURVES FROM A SINGLE MASTER CONTROL ELEMENT

Russell S. Thatcher, Houston, Tex., assignor, by mesne assignments, to Dresser Industries, Inc., Dallas, Tex., a corporation of Delaware Application May 3, 1956, Serial No. 582,536

10 Claims. (Cl. 340—15)

This invention relates to new and useful improvements in apparatus for generating a family of curves from a single master control element.

The apparatus has been found particularly applicable in the reproduction of seismic records and will be described herein as employed for that purpose, although it is to be understood that the invention is not to be restricted to such use.

It is one object of this invention to provide an apparatus having a master control element, usually in the form of a master curve or cam, the contour of which is representative of certain known information, together with a plurality of means controlled by said control element for simultaneously effecting a plurality of desired movements of said means, whereby even though the movements of the controlled means are dissimilar, each is caused by and under the control of the master control element so that said movements are, in fact, effected in accordance with the certain known information of which the master element is representative.

In the seismic surveying field, seismic records are made by detonating a charge in a "shot hole" and the seismic waves so generated traverse the earth's subsurface formations and are reflected back from the subsurface layers to be received by geophones at the surface. In accordance with well known practice, the geophones are located at various receiving points which are spaced different distances in a horizontal plane from the shot point; due to the difference in spacing between the point of detonation and the receivers, all of said receivers do not receive the reflected seismic wave at the same instant of time with the result that the "kicks" or excursions in the traces on the seismic record are not in exact alignment but rather are offset and staggered on the final record. As is well known, the trace is continuously recorded and the instant of reception of the reflected wave causes an amplitude change which is definitely recorded in the form of an amplified variation in the trace line, such variation being referred to herein as a "kick" or excursion in said trace. The difference in the "kicks" or excursions of one trace relative to the "kicks" or excursions of adjacent traces is generally referred to as "move out" or "step out" error in the final seismic record and, as mentioned, is due to one geophone receiver being at a farther distance from the point of detonation. Normally, correction for move out error has been made by draftsmen in replotting the seismic records obtained in the field, but obviously such method is time-consuming and costly and is also subject to human error in the interpretation and replotting of the field record.

The present invention provides an improved apparatus which is adaptable for use with a usual seismic record producing device and which will accurately reproduce seismic field records while automatically correcting for the "move out" error present in such records, whereby final seismic maps or layouts may be rapidly and expeditiously made without the necessity of interpreting and replotting the field records, as is now the general practice.

In seismic exploration the velocity of sound through the subsurface formation, together with the distance between shot point and receivers are the two main factors from which the move out error appearing in the field record may be determined. Of course, the distance between shot point and receivers is known, and if the geologist is familiar with the subsurface formations under investigation, the velocity of sound therethrough, generally referred to as a velocity curve, may also be readily determined.

The present invention utilizes this predetermined information in that the master control element of the apparatus is constructed in accordance therewith.

A further object is to provide an apparatus of the character described, wherein a master control cam having a contour which is derived from the velocity curve or from the velocity information concerning the particular formation under examination and the information relating to geophone spacing is employed to control a compensating means during the reproduction of the seismic field record, whereby the move out errors in said record are automatically compensated for and are thereby removed from the final record.

Still another object is to provide an apparatus of the character described, wherein a master control cam having a predetermined curvature is employed to control the movement of a plurality of adjustable cams which, in turn, control the actuation of a compensating means, each adjustable cam being provided for one trace of the field seismic record whereby said cam actuates its compensating means to remove the move out errors in said trace during the reproduction of the record.

A particular object is to arrange the actuating cams which are controlled by the master control element so that each of said actuating cams is independently adjustable relative to the other actuating cams, whereby each cam, although operated by the master control element, actuates its compensating means independently of the other compensating means.

The construction designed to carry out the invention will be hereinafter described, together with other features thereof.

The invention will be more readily understood from a reading of the following specification and by reference to the accompanying drawings forming a part thereof, wherein an example of the invention is shown and wherein.

In the drawings the invention is illustrated as being employed in the reproduction of seismic field records for the purpose of correcting the usual move out or step out errors which occur during the making of such field records. However, as has been mentioned, the invention has many other applications and may be used for other purposes.

Figure 1:
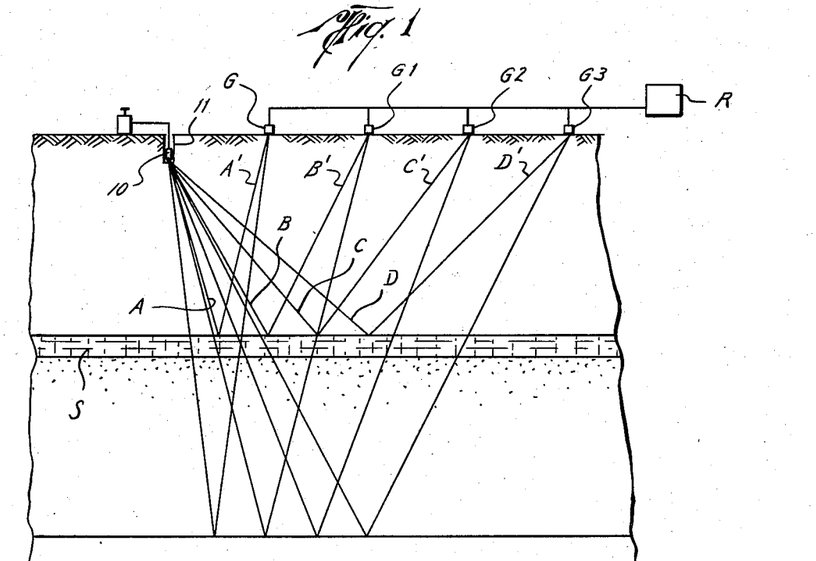
Figure 1 is a schematic diagram illustrating the manner in which a seismic field record is made and showing the receiver geophones spaced at varying distances from the detonated charge.

Referring to Figure 1, which is a schematic diagram illustrating the usual seismic survey method, a suitable charge or shot 10 is detonated within a shot hole 11 and the detonation of said charge or shot generates seismic waves which traverse the subsurface formations. A seismic wave A travels downwardly from the shot or charge and is reflected back upwardly from the upper surface of a strata S, the reflected wave being indicated by A'. A geophone receiver G receives the reflected wave and at the instant of reception generates an energy impulse which results in an amplitude change in the trace which is recorded on the seismic record by the recorder R, this amplitude change being visibly recorded in the form of a "kick" or excursion in the trace line. Similarly, a wave B is reflected as indicated by B' and is received by geophone G1; waves C, C' and D, D' are similarly received by geophones G2 and G3. It is noted that the geophones are spaced at different points from the shot hole 11; therefore the time between detonation of the charge and reception by the geophones will vary because of these different distances in location of the geophones. Also the particular subsurface formation through which the initial waves and the reflected waves are traveling constitutes another factor which affects the time of reception of said waves.

Figure 2:
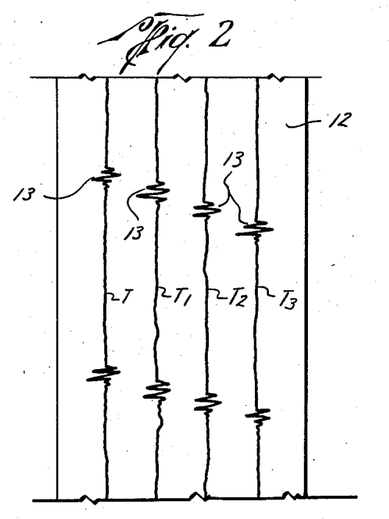
Figure 2 is a partial, enlarged view of a field seismic record illustrating the move out errors in the original traces.

The method illustrated in Figure 1 is standard practice and the particular field seismic record which is produced is partially illustrated in Figure 2. The record is usually in the form of a tape 12 having traces T, T1, T2 and T3 thereon. Geophone G controls the "kicks" or excursions 13 which are formed in the trace T and which indicate the instant of reception of a reflected wave. Similarly, geophones G1 to G3 control the forming of the kicks or excursions 13 in traces T1 to T3, respectively. As is clearly shown in Figure 2, the kicks or excursions in traces T to T3, which are representative of the upper surface of strata S, are not transversely aligned with respect to the tape 12, this misalignment being caused by the time delay factor in the reception of reflected waves; thus, the kicks or excursions 13 appearing on the traces are not an accurate indication of the upper level of the substrata S. As shown in Figure 1, the strata S has its upper surface extending in substantially a horizontal plane and therefore if all of the reflected waves were received at the same instant the kicks or excursions 13 in traces T to T3 would be aligned transversely of the tape to indicate that the upper surface of strata S is, in fact, in a horizontal plane. Because of the time delay factor which results by reason of the geophones being located at different distances from the shot point, the kicks 13 occur angularly with respect to a transverse plane across the tape 12, such positioning being indicated in Figure 2.

As is well known, the offsetting between kicks in adjacent traces, which are representative of the instant of reception by the various geophones, is generally referred to as "move out" or "step out" error, and is recognized as being present in the seismic record made in the field. It has been the practice in the past to compensate for this move out error when the seismic field records are reproduced in the final seismic layout record, this normally being done by the draftsman who interprets the field records and transfers the information thereon to a final layout. In this connection, the interpretation of the field record and its transposition to a final layout takes into consideration the distances between the various geophones and the shot point as well as the so-called "velocity curve" of the subsurface formation which was investigated. As is well known, the "velocity curve" is the velocity of the sound waves through the formation under investigation and obviously, by considering this velocity curve, together with the distance between each geophone and the shot point, proper compensation for the move out error may be made.

In carrying out the present invention the apparatus provided herein is applicable for automatically correcting or compensating for the move out error which appears in the seismic field record, such compensation or correction being accomplished during the reproduction of the record by a photographic or other reproduction means.

Figure 4:
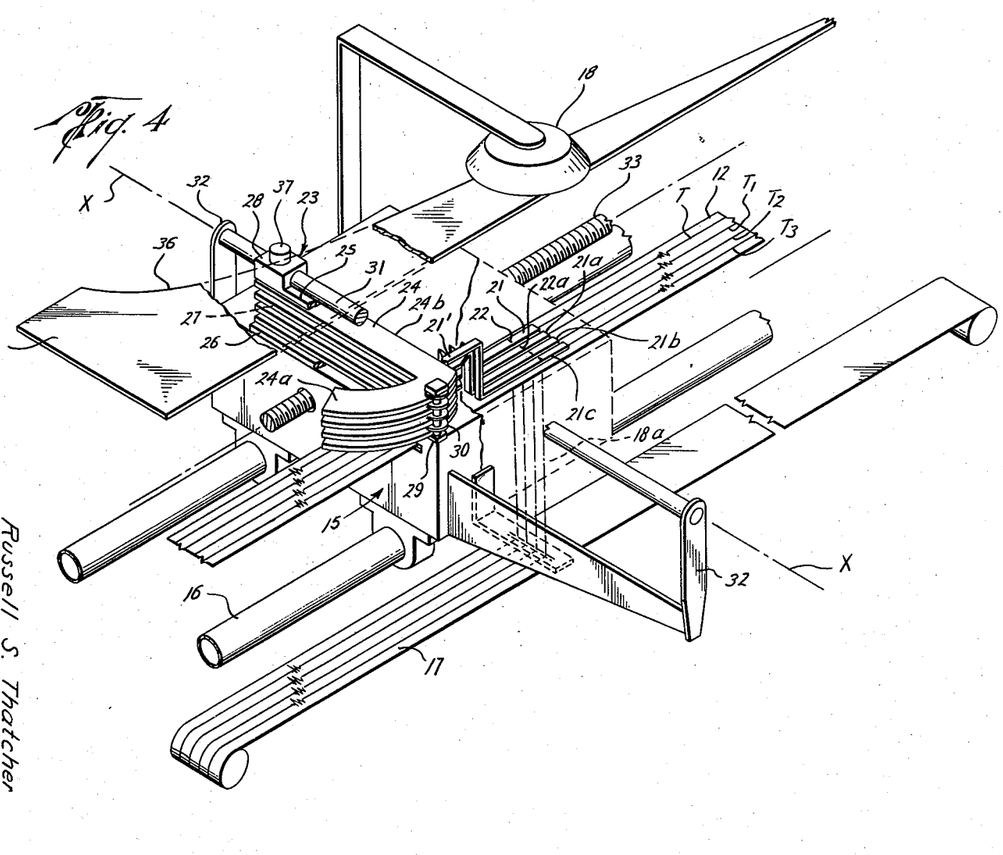
Figure 4 is a diagrammatic, isometric view of an apparatus constructed in accordance with the invention and illustrating the actuating cams in position prior to adjustment thereof.
Figure 5:
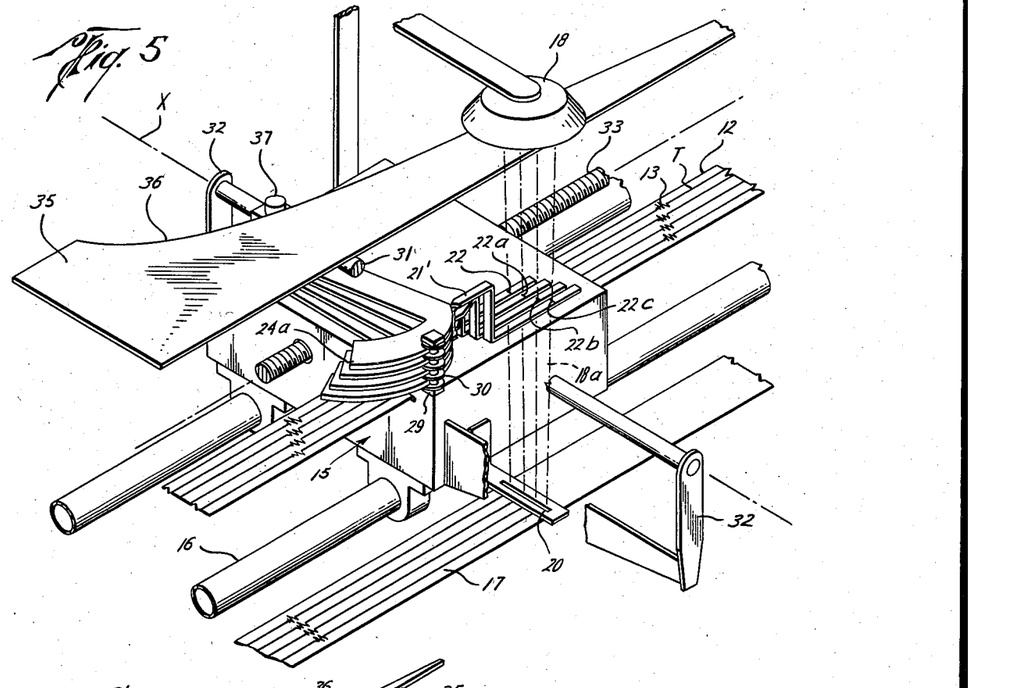
Figure 5 is a similar view with the actuating cams in adjusted position.
Figure 6:
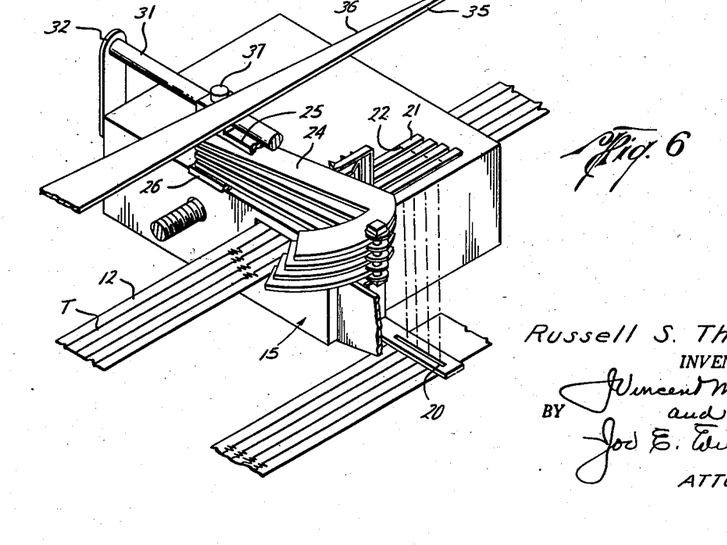
Figure 6 is a similar view, with the carriage assembly at substantially the end of its travel.

Referring to Figures 4, 5, and 6, wherein the apparatus comprising the present invention is generally illustrated, said apparatus includes a main carriage assembly 15, which is movable along a longitudinal path, being mounted on suitable guide rods 16. The seismic field record 12 in negative form is arranged to extend through the carriage assembly 15 and is supported at its ends by suitable means, such as rollers or reels (not shown), whereby the carriage assembly 15 may traverse the entire length of a particular section of said record. Disposed below the seismic field record 12 and in vertical alignment therewith is a record tape 17 upon which the traces T to T3 of the record 12 are adapted to be projected and reproduced, such tape 17 thus becoming the final seismic record. A light source 18 is carried by a suitable bracket 19 secured to the carriage assembly 15 and by a suitable arrangement of optical components is adapted to project light downwardly through an opening 18a formed in the carriage assembly, which opening is disposed between the seismic field record 12 and the record tape 17. The printing aperture is preferably formed in the manner shown in Figure 16 wherein the plate 20a is transparent and has its underside coated with a coating 20b which prevents light passage; the coating has a slit which forms the printing aperture 20.

For photographing a portion of each trace as the carriage assembly traverses the seismic record 12 to thereby reproduce such portion upon the record tape 17, a plurality of aperture elements 21, 21a, 21b and 21c are provided, and these aperture elements overlie the opening 18a which allows the passage of light from the light source 18 downwardly to the printing aperture 20 in plate 20a and to the record tape 17. An aperture element is provided for each trace on the seismic field record and, as shown in Figure 4, the element 21 has a transverse slit or narrow aperture or opening 22 disposed therein. Similarly, the element 21a has a slit 22a, the element 21b has a slit 22b, and element 21c has a slit 22c therein. Four of the aperture elements or members have been shown because four traces T to T3 have been illustrated on the seismic record, but it is apparent that any desired number of aperture elements may be provided in accordance with the number of traces on the seismic field record which is being reproduced.

Each aperture element is mounted upon the carriage assembly 15 in any suitable manner so as to undergo a limited movement in a plane parallel to the path of longitudinal movement of the carriage assembly so that said elements are, in effect, adjustable. Since only that portion of the trace of the seismic field record is being reproduced as will be aligned with the slit or opening in the aperture element, it is apparent that by adjusting the aperture elements on the assembly the relationship of each aperture with respect to the light source 18 thereabove and also in relationship to the printing aperture 20 therebelow is controlled to control the angle of projection of the light passing through the negative seismic field record and to the record tape 17. Thus the traces on the field record may be reproduced in different relationships upon the record tape in accordance with the positioning of the aperture elements.

Figures 15, 16:
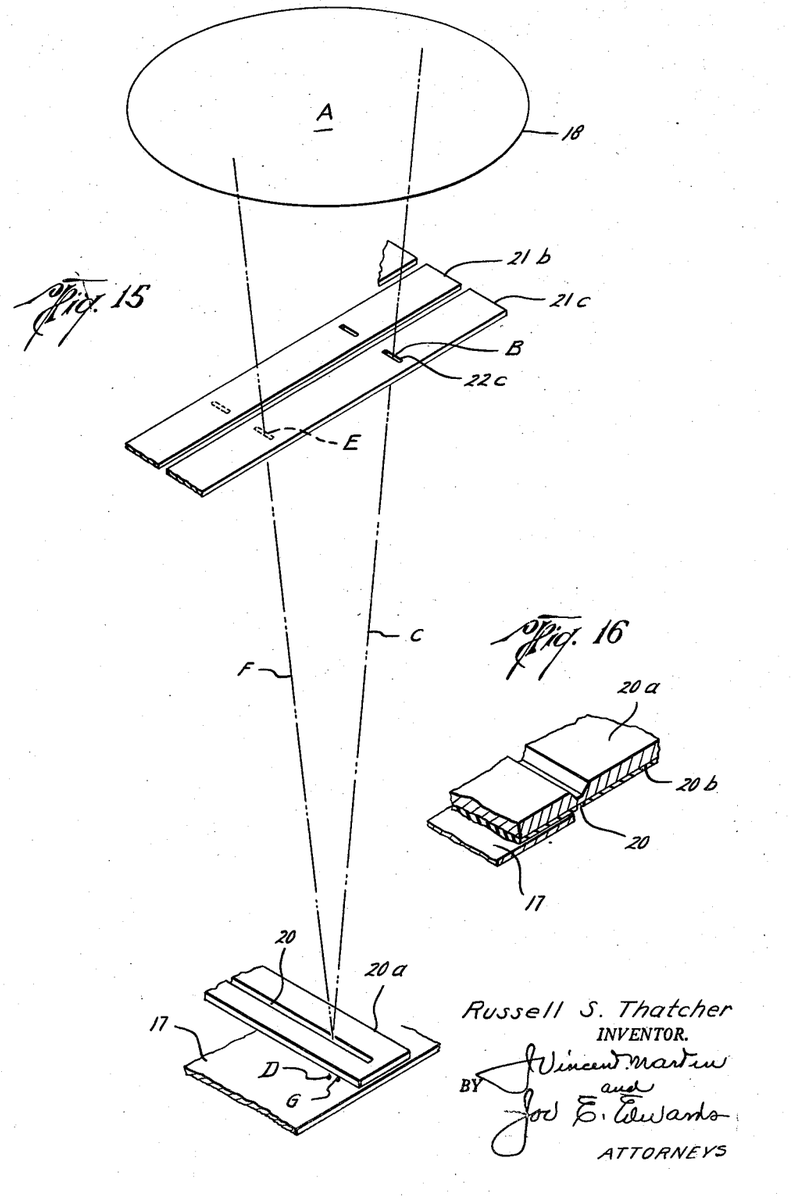
Figure 15 is a diagram of the light projection and the manner of control thereof by the aperture elements.
Figure 16 is a detail of the printing aperture.

Figure 15 illustrates the light paths of the system and further illustrates the manner in which adjustment of the aperture elements controls the position at which the trace and its kicks are reproduced on the record tape 17. As shown in this figure, the light rays A from the light source 18 are directed downwardly and with one of the aperture elements in the position B, a light ray C is projected through the printing aperture 20 of plate 20a so as to reproduce the trace from the negative field record 12 upon the record tape 17 at point D. When the aperture element is moved to position E in Figure 15, the angle of light projection is changed so that the light ray F is projected through the printing aperture and upon record tape 17 at point G. It is therefore apparent that by adjusting the aperture element the position of reproduction of each trace and the kicks therein upon the record tape may be controlled.

When the aperture elements are adjusted so that their apertures or slits are all in exact transverse alignment, then as the carriage 15 traverses the record tape, the traces T to T3 will be reproduced in their same relationship upon the record tape 17. However, by moving the aperture elements to various relative positions with respect to each other, light is projected at varying angles to the printing aperture 20 and hence to the record tape 17. Since the printing aperture 20 extends along a straight transverse line, light projected from different positions will be reproduced in a straight line on the record 17. With this arrangement, the position of the aperture elements controls the manner in which each trace and the kicks or major excursions of each trace are reproduced on the tape 17, and obviously, if the movement of the aperture elements 21 to 21c is in accordance with the move out error in the original field record, the reproduction on tape 17 will be a record corrected for such move out errors.

For controlling the movement of the members 21 to 21c, a subassembly 23 is mounted upon the carriage 15, and said subassembly includes a plurality of actuator cam bars 24 which extend in a horizontal plane. One actuator cam bar 24 is provided for each aperture element 21 to 21c, and said actuator bars are disposed in overlying relationship to each other, being confined between an upper plate 25 and a base plate 26, which plates form the main supporting members of the subassembly. Each actuator bar has one end pivoted upon a vertical pin 27 which extends between the plates 25 and 26 and which has its upper end secured within a block 28 formed integral with one end of the upper plate member 25. Thus each actuator cam bar 24 is capable of an independent swinging movement on the pivot pin 27 so that the relative angular position of one cam bar with respect to the others may be adjusted or varied. For clamping the cam bars in adjusted positions, each cam bar has an arcuate extension 24a which has its marginal edge adjacent a clamping bolt 29 and a plurality of clamping washers 30 are interposed between said arcuate extensions 24a and overlies the marginal portions thereof, whereby, when the bolt 29 is properly tightened, the various bars 24 are frictionally clamped together and are locked against movement with respect to each other.

The subassembly 23 which carries the actuator bars 24 is adapted to be moved in a plane transversely of the carriage 15 along the axis X indicated in Figure 4. The subassembly is slidably supported upon a guide rod 31 which has its ends fastened to upstanding brackets 32 secured by the carriage 15, and thus the entire subassembly may be moved in a plane transversely of the longitudinal path of movement of the carriage. Each actuator bar 24 has a longitudinal edge portion 24b which is in constant engagement with an extension 21' formed on the respective aperture element associated with that bar. Therefore, when the subassembly 23 is moved laterally or transversely of the carriage 15, the longitudinal edge 24b of each actuator bar 24 coacts with the extension 21' of its respective aperture element to control the position of said element. As will be explained, when the actuator bar is at an angle to the transverse axis X, then, upon a travel of the subassembly, the aperture element, which is controlled in its movement by that actuator bar, is adjusted to control the projection of light through the seismic field record 12 and thereby control the manner of reproduction of the traces upon the record tape 17.

The carriage 15 is moved longitudinally to traverse the seismic field record at the desired speed or rate of travel by any suitable means, such as a rotating feed screw 33. As the carriage traverses the record 12, the apertures of the elements 21 to 21c must be adjusted to control the reproduction of the traces T to T3 on the record tape 17 to properly compensate for move out errors. It is noted that the move out error appearing in seismic field records decreases with depth, and therefore the excursions or amplitude changes in the traces representing a subsurface formation nearer the earth's surface may have a greater move out error than the kicks or excursions which represent a subsurface strata located at a greater depth. Therefore, as will be described, the apparatus is properly adjusted for each section of the field record 12 which is being reproduced so that an accurate compensation and correction for move out error is made in the final reproduced record tape 17.

For controlling the transverse movement of the subassembly 23 which carries the actuator bars 24, a master control element or cam 35 is mounted in a fixed position adjacent the path of longitudinal travel of the carriage 15. As illustrated in Figures 4 and 5, this master control element is in the form of a rectilinear cam having a curved cam surface 36 which, as will be explained, has a contour of predetermined curvature. A roller 37, which is located at the upper end of the block 28 of the subassembly, is engaged with the curved cam surface 36 and is maintained in constant contact therewith by a suitable spring means (not shown) acting upon the subassembly 23 in a direction to hold the roller in contact with the cam surface 36. With the subassembly roller 37 in contact with the cam surface 36 of the fixed master control element 35, the travel of the carriage 15 in a longitudinal direction will cause the roller 37 of the subassembly 23 to follow the cam surface 36. As the carriage moves longitudinally to traverse the seismic field record 12 in the manner hereinbefore described, the subassembly which carries the actuator bars 24 is caused to move transversely of the carriage along axis X and such movement is in a predetermined manner in accordance with the curvature of the cam surface 36. As the subassembly is moved transversely under control of the cam surface, the actuator bars 24 are moved transversely with respect to the extensions 21' of the aperture elements 21 to 21c, resulting in a coaction between said bars and the aperture elements, whereby said apertures are controlled or moved in accordance with the adjustment of the individual bars 24 and also in accordance with the curvature of the cam surface 36.

The control of the aperture elements by the cam bars is more clearly illustrated in Figures 7 to 10 wherein only a single aperture element 21 and a single actuator bar 24 is shown. As has been previously mentioned, the move out error which appears in seismic field records is due primarily to the fact that each geophone receiver is spaced a different distance from the shot point. However, the time or instant of reception of any reflected wave is also dependent upon the particular subsurface formation through which the seismic wave is traveling and the curvature of the cam surface 36 is predetermined in accordance with the velocity curve of the particular subsurface formation under investigation and also in accordance with the geophone spacing. By knowing the particular formation and the velocity of sound through that formation as well as having a knowledge of the geophone spacing, it is possible to plot a move out error curve of the particular subsurface structure which was under investigation at the time that the field record 12 was made. The move out error curve is represented by the curvature of the cam surface 36 of the main control cam element. Since average sound velocity change with depth remains practically constant in subsurface structures under a relatively large surface area (within a 25-mile radius of the shot point) it can be assumed that the timing errors found in the original field record 12 are not a result of variation in the average sound velocity distribution below each successive geophone but rather are due to the progressively greater horizontal distance or spacing of each successive geophone from the shot point. To compensate for this sound time difference caused by the variation in geophone spacing, the actuator bars 24 are made adjustable in an angular position with respect to each other.

Figure 7:
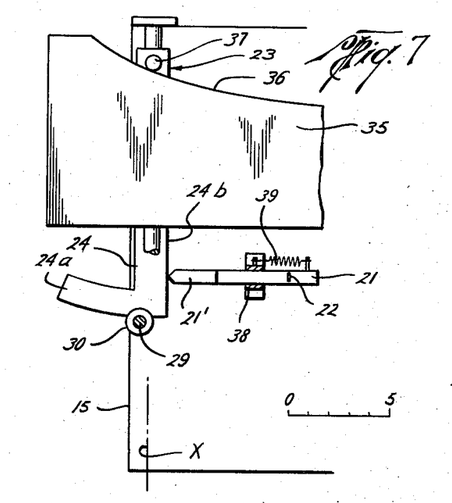
Figures 7 and 8 are diagrams showing the action of one of the actuating cams at the beginning and end of its travel.
Figure 8:
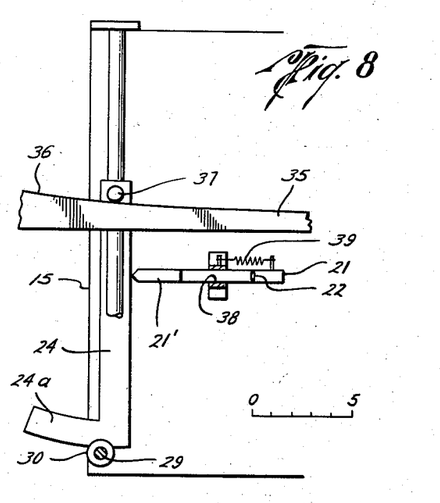

Referring to Figures 7 and 8 which illustrate the actuator bar 24 of the subassembly 23 as being positioned with its cam edge 24b disposed at substantially a right angle to the longitudinal path of travel of the carriage 15, it will be seen that this edge 24b engages the extension 21' of its aperture element 21 in the same relative position at all positions of the carriage 15 relative to the master cam 35. At the start of the travel of the carriage 15, the roller 37 of the subassembly 23 is engaging the cam surface 36 at its starting portion. At this time the edge 24b of the actuator bar 24 is substantially parallel to the axis X of the travel of the subassembly and has the extension 21' of the aperture element 21 engaged therewith. As has been noted, the aperture elements may be mounted in any suitable manner and, as illustrated in Figures 7 and 8, each element is slidable within a keeper 38 and a spring 39 maintains the extension 21' in constant contact with edge 24b.

As the carriage 15 moves longitudinally to traverse the seismic field record 12, the roller 37 follows the cam surface 36 of the master control element or cam 35 and this results in the subassembly 23 being moved laterally or transversely of carriage 15 along the axis X. By the time the carriage has completed its travel, the roller 37 has moved along the cam surface 36 to the position shown in Figure 8. With the actuator bar 24 adjusted so that its edge 24b is parallel to the axis X of travel of the subassembly, the extension 21' of the aperture element 21 has merely moved along the edge 24b without any motion relative to the carriage 15 being imparted to the aperture element. Thus throughout the travel of the carriage there has been no adjustment of the aperture or slit 22 of element 21, with the result that the trace T of the field record 12 will be exactly reproduced on the record tape 17 with all excursions or kicks in the trace T maintaining their same relative position on both field record and record tape.

Figure 9:
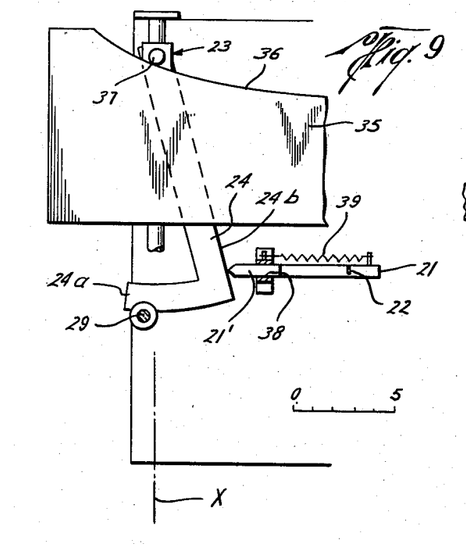
Figures 9 and 10 are views similar to Figures 7 and 8 but with the actuating cam in a differently adjusted position relative to the carriage assembly.
Figure 10:
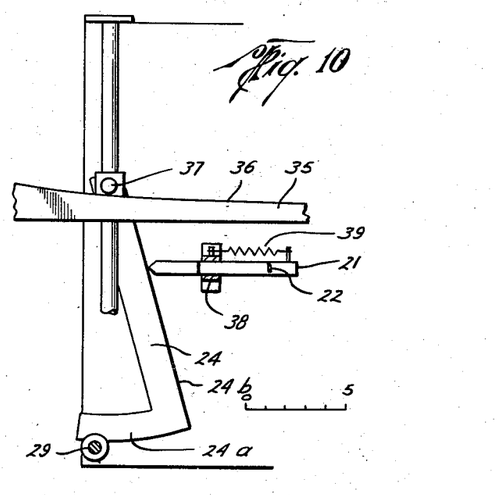

Figures 9 and 10 illustrate the operation or movement of the aperture element 21 when the actuator bar 24 has been adjusted in accordance with the time delay in reception of a particular signal. Referring to Figure 9, the actuator bar 24 of the subassembly 23 has been swung about its pivot 27 and has been clamped in adjusted angular position by the bolt 29 and washers 30. In such case the cam edge 24b of the bar is disposed at an angle relative to the axis X of movement of the subassembly.

When the carriage first begins its movement in a longitudinal path traversing the field record 12, the actuator bar is as shown in Figure 9 and the extension 21' of element 21 is engaged with the outer portion of the edge 24b. As the carriage moves longitudinally, the roller 37 of the subassembly 23 follows the contour of the cam surface 36 and as the subassembly 23 moves transversely of the carriage, the extension 21' of aperture element 21 rides upon the inclined edge 24b of the actuator bar, whereby a movement is imparted to said aperture element 21. Such movement is in a plane parallel to the longitudinal path of movement of the carriage and this results in a change in the position of the aperture or slit 22 provided in said aperture element relative to the carriage 15. The relative position of the aperture with respect to the light source 18 and with respect to the printing aperture 20 above the tape 17 changes the angle of light projection and results in reproducing the excursions or kicks upon the tape 17 in a different relative position than such kicks have upon the field record 12. It is evident that by proper adjustment of the various actuator bars which control the relative position of the apertures in the elements 21 to 21c, it is possible to reproduce the kicks or excursions in the various traces in any desired relative position. Actually, the position of the apertures is in accordance with the velocity curve of the particular formation under investigation and in accordance with the spacing between geophone receivers. By adjustment of the actuator bars the time interval differences between the instance of reception of the waves by the geophones may be compensated for, and a record which will correct for the usual move out errors is thereby produced.

Figure 3:
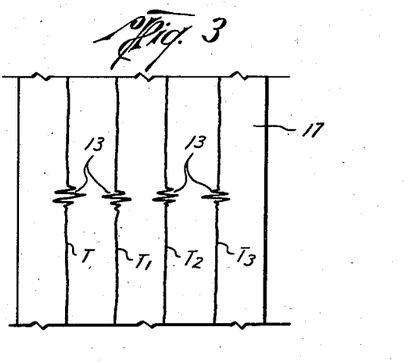
Figure 3 is a similar view illustrating a portion of the reproduced record which has been corrected for move out errors.

The record produced on the tape 17 by reason of the proper adjustment of the various aperture elements is illustrated in Figure 3. As shown therein, the kicks or excursions 13 in the traces T, T1, T2 and T3 are all reproduced on the tape 17 in transverse alignment with each other. This clearly illustrates that the subsurface strata S has an upper surface which lies in a horizontal plane. The actuator cam bars 24 controlling the aperture elements associated with the traces T1 to T3 were properly adjusted in accordance with the initial move out value for the corresponding geophone at the point with respect to record time at which the correction of traces is to start. It is therefore possible to properly adjust the cam bars 24 in accordance with geophone spacing and average velocity for the area and to reproduce the field record upon the tape 17 in such a way that all move out or step out errors are eliminated. The apparatus operates continuously and permits rapid reproduction of the field records while at the same time eliminating the human error.

It might be noted that since the field record is a series of records, each with a different shot point and normally of considerable length, the reproduction is actually accomplished in sections, that is, one section or one seismogram corresponding to the length of travel of the carriage 15 is reproduced, after which the carriage is returned to initial position and after proper re-positioning and adjustment is then caused to traverse the next section of the record. By such arrangement, the entire record may be quickly and accurately reproduced while automatically compensating for the move out errors. Of course it is obvious that the contour of the cam surface 36 of the master control element is subject to variation, but it is always predetermined to be representative of the geophone spread and velocity curve of the particular subsurface formation which was under investigation at the time that the seismic field record 12 was made.

Figure 11:
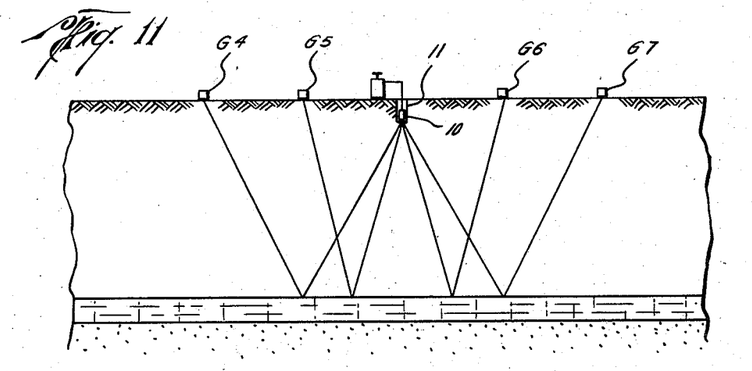
Figure 11 is a schematic diagram of a seismic field arrangement where geophone receivers are disposed on both sides of the shot point.
Figure 12:
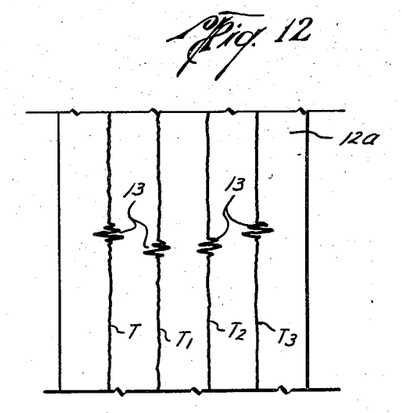
Figure 12 is a partial view of the seismic record made by the method of Figure 11.

In Figures 1 to 10 the apparatus is illustrated as compensating for move out errors wherein the geophone receivers are all located on one side of the shot point. However, the apparatus may be employed for reproducing records which are made with the geophone receivers located on each side of the shot point. As shown in Figure 11, the charge or shot is detonated in the shot hole 11 and geophones G4 and G5 are disposed on one side of the shot hole, while geophones G6 and G7 are disposed on the opposite side. With this type of seismic surveying, a record 12a, such as shown in Figure 12, would be produced. Geophone G4 would produce the kick or excursion 13 in trace T, while geophone G5 would control the excursions in trace T1. The excursions or kicks 13 in trace T2 result from the reception of sound waves by geophone G6, while trace T3 is actuated by geophone G7. As seen in Figure 12, the geophones G5 and G6 receive the signal at substantially the same time and in advance of the reception of signals by geophones G4 and G7.

Figure 13:
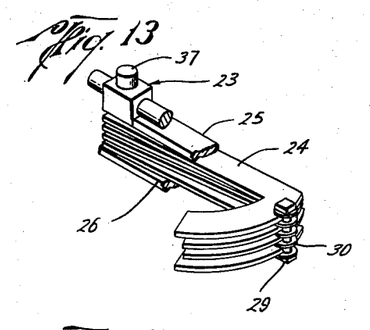
Figure 13 is a partial isometric view of the actuating cams and illustrating their adjustment to compensate for the move out errors in the record of Figure 12.
Figure 14:
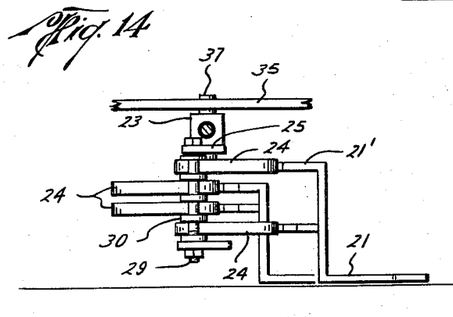
Figure 14 is an end view of the actuating cams shown in Figure 13.

In reproducing a record of this type upon a tape, the actuator bars 24 would be adjusted in the manner illustrated in Figures 13 and 14. By observing Figure 14 it will be seen that the two outermost actuator bars 24 are at a different angle than the two inner bars 24, such angle being in accordance with the time difference in the reception of the signals by the two outer geophones G4 and G7, as compared to reception by the inner or closer geophones G5 and G6. The subassembly 23 is, of course, controlled in its transverse movement b the master control element or cam 35 which has its cam surface of a contour which is representative of the geophone spread used and the velocity curve of the formation under investigation. It will be evident that upon operation of the apparatus the aperture elements are adjusted and moved so as to reproduce the kicks 13 in the traces T1 to T3 in proper alignment to compensate for the move out error.

It is pointed out that for purposes of illustration much of the structural details of the apparatus have been omitted. For example, the manner of mounting the aperture elements for a movement parallel to the longitudinal path of movement of the assembly has been more or less schematically illustrated. The particular spring means which maintains the subassembly roller 37 in contact with the cam surface 36 has been omitted, but obviously any suitable means which will maintain the roller in contact with the cam surface may be employed. A screw means 33 has been indicated as providing the motive power for the assembly 15, but any type of drive means for moving said assembly at the desired speed may be employed. The details of the light source 18 and lens to properly resolve the light and the photographic reproduction of the traces from the field record 12 onto the record tape 17 have also been omitted, since this type of photographic means is well known. Also, since a photographic reproduction is indicated, the record tape 17 would actually be mounted inside a lightproof housing and would probably be in the form of a negative film or enlargement paper. The manner of forming the aperture 22 in the element 21 is variable but it has been found satisfactory to make the element of a transparent material and then silver or otherwise blank the underside thereof except for a transverse slit which forms the aperture 22.

The various details of construction which are subject to wide variation and which are well known in the art are not necessary to a full understanding of the present invention which basically involves the control of the aperture elements 21 to 21c by means of the actuator bars 24 which, in turn, are controlled in their movement by a master control element having a cam surface whose contour is representative of certain known facts.

Although the invention has been described herein as applied to the reproduction of seismic records to eliminate the normal move out error which appears in such records, it is apparent that the basic apparatus may be employed for other purposes. Wherever it is desired to control the position of certain members, such as the aperture elements 21 to 21c, by mechanism which is representative of known factors, the apparatus could be employed. The independent adjustment of the actuator bars 24 permits individual and separate movement of the members being controlled, even though the subassembly and all of the actuators mounted thereon are, in turn, controlled by a master control element. The contour of the cam surface 36 of the master control element will, of course, be representative of some known information and the adjustment of the actuator bars will also be representative of other known information; thus, the members being controlled are positioned and moved automatically in accordance with such known information as the carriage moves through its longitudinal path and with respect to the master control element 35.

The foregoing disclosure and description of the invention is illustrative and explanatory thereof, and various changes in the size, shape and materials, as well as in the details of the illustrated construction may be made, within the scope of the appended claims, without departing from the spirit of the invention.

What I claim is:

1. An apparatus for controlling the movements of a plurality of members including, a carriage having the members to be controlled movably mounted thereon, said carriage being adapted to travel in a longitudinal plane, a subassembly mounted on the carriage and adapted to be moved in a plane transversely of the longitudinal plane in which the carriage travels, a master control element co-acting with said subassembly to effect movement thereof when the carriage undergoes a movement with respect to said master control element, a plurality of actuators mounted on said subassembly and associated with the members to be controlled, each actuator co-acting with one of the members when the subassembly is moved to control movement of said member, and a master control element co-acting with the subassembly to effect movement thereof when the carriage undergoes a movement with respect to said master control element.

2. An apparatus for controlling the movements of a plurality of members including, a carriage having the members to be controlled movably mounted thereon, said carriage being adapted to travel in a longitudinal plane, a subassembly mounted on the carriage and adapted to be moved in a plane transversely of the longitudinal plane in which the carriage travels, a master control element co-acting with said subassembly to effect movement thereof when the carriage undergoes a movement with respect to said master control element, a plurality of actuators mounted on said subassembly and associated with the members to be controlled, each actuator co-acting with one of the members when the subassembly is moved to control movement of said members, and means for mounting each actuator for independent adjustment on the subassembly whereby a movement of the subassembly by said master control element will result in controlled movements of the members in accordance with the adjusted positions of said actuators.

3. An apparatus for controlling the movements of a plurality of members including, a carriage having the members to be controlled movably mounted thereon, said carriage being adapted to travel in a longitudinal plane, a subassembly mounted on the carriage and adapted to be moved in a plane transversely of the longitudinal plane in which the carriage travels, a plurality of actuators mounted on said subassembly and associated with the members to be controlled, each actuator co-acting with one of the members when the subassembly is moved to control movement of said member, a master control cam having a predetermined contour which is adapted to co-act with the subassembly to impart movement to the subassembly in a plane transversely of the carriage when the carriage travels in a longitudinal plane, and means for moving the carriage relative to the master control cam at a predetermined speed with respect to time.

4. An apparatus as set forth in claim 3, together with means for mounting each actuator for independent adjustment on the subassembly whereby a movement of the subassembly by said master control cam results in controlled movements of the members in accordance with the adjusted positions of said actuators.

5. An apparatus as set forth in claim 3, wherein the predetermined contour of the cam is representative of certain known information, whereby the movement of the members is controlled in accordance with such information.

6. An apparatus for controlling the movements of a plurality of members including, a carriage having the members to be controlled mounted thereon, said carriage being movable in a longitudinal path, a plurality of actuators mounted on the carriage and movable in a plane at a right angle to the longitudinal path of travel of the carriage, one actuator being associated with each member to be controlled and adapted, upon being moved relative to the carriage, to impart movement to its associated member, means for adjusting the position of each actuator relative to the carriage and independently of the other actuators, and a master control element co-acting with the actuators for imparting movement to the actuators when the carriage is moved along its longitudinal path with respect to the control element.

7. An apparatus for controlling the movements of a plurality of members including, a carriage having the members to be controlled mounted thereon, said carriage being movable in a longitudinal path, a plurality of actuators mounted on the carriage and movable in a plane at a right angle to the longitudinal path of travel of the carriage, one actuator being associated with each member to be controlled and adapted, upon being moved relative to the carriage, to impart movement to its associated member, means for adjusting the position of each actuator relative to the carriage and independently of the other actuators, a master control element co-acting with the actuators for imparting movement to the actuators when the carriage is moved along its longitudinal path, and means for moving the carriage along its longitudinal path at a predetermined speed with respect to time.

8. An apparatus as set forth in claim 6, wherein each actuator comprises a pivotally mounted cam bar, and means for clamping said bar in predetermined adjusted position.

9. An apparatus for controlling the movements of a plurality of members including, a carriage having the members to be controlled mounted thereon, said carriage being movable in a longitudinal path, a plurality of actuators mounted on the carriage and movable in a plane at a right angle to the longitudinal path of travel of the carriage, one actuator being associated with each member to be controlled and adapted, upon being moved relative to the carriage, to impart movement to its associated member, means for adjusting the position of each actuator relative to the carriage and independently of the other actuators, a master control cam having a predetermined contour which is adapted to co-act with actuators for imparting movement to said actuators when the carriage is moved along its longitudinal path with respect to said control cam, the contour of said control cam being representative of known information, whereby movement of the actuators and resultant movement of the members being controlled is in accordance with such known information.

10. Apparatus for controlling the movements of a plurality of members comprising, a sub-carriage movable in a fixed direction, a plurality of actuators pivotally mounted about a single axis on said sub-carriage, each of said actuators being pivotable independently of the other actuators and means for securing each actuator in a selected pivoted position relative to the plane common to said single axis and said fixed direction, each of said members being associated with one of said actuators and being movable independently transverse to said plane, a master control means adapted to co-act with said sub-carriage for imparting movement thereto in said fixed direction in response to relative movement between said control means and said sub-carriage in a direction transverse to said plane and means for producing said relative movement.

References Cited in the file of this patent

UNITED STATES PATENTS

| | | |
|---|---|---|
| 2,243,730 | Ellis | May 27, 1941 |
| 2,440,971 | Palmer | May 4, 1948 |
| 2,604,955 | Hawkins | July 29, 1952 |
| 2,765,455 | Meiners | Oct. 2, 1956 |
| 2,800,639 | Lee | July 23, 1957 |
| 2,825,885 | Reynolds | Mar. 4, 1958 |